United States Patent
Miyamoto

(10) Patent No.: US 8,365,588 B2
(45) Date of Patent: Feb. 5, 2013

(54) PISTON RING TENSION MEASUREMENT APPARATUS

(75) Inventor: Atsuko Miyamoto, Chiyoda-ku (JP)

(73) Assignee: TPR Co, Ltd., Chiyoda-ku, Tokyo (JP)

(*) Notice: Subject to any disclaimer, the term of this patent is extended or adjusted under 35 U.S.C. 154(b) by 39 days.

(21) Appl. No.: 13/177,285

(22) Filed: Jul. 6, 2011

(65) Prior Publication Data

US 2012/0006121 A1    Jan. 12, 2012

(30) Foreign Application Priority Data

Jul. 7, 2010    (JP) .................. 2010-154795

(51) Int. Cl.
*G01M 15/00* (2006.01)

(52) U.S. Cl. .................... 73/114.78; 33/605

(58) Field of Classification Search ............ 73/114.78; 33/605
See application file for complete search history.

(56) References Cited

U.S. PATENT DOCUMENTS

| | | | | |
|---|---|---|---|---|
| 1,036,448 A | * | 8/1912 | Campell ............... | 73/114.78 |
| 3,693,424 A | * | 9/1972 | Wagle .................. | 73/114.78 |
| 3,946,602 A | * | 3/1976 | Huntington et al. .... | 73/114.78 |
| 5,633,459 A | * | 5/1997 | Rodriguez ............. | 73/114.78 |
| 5,974,871 A | * | 11/1999 | Kanda et al. ......... | 73/114.78 |
| 6,196,063 B1 | | 3/2001 | Kasai et al. | |

FOREIGN PATENT DOCUMENTS

| | | |
|---|---|---|
| DE | 36 03 689 | 2/1987 |
| DE | 10 2005 023 6 | 11/2006 |
| EP | 0 877 239 | 11/1998 |
| JP | 61-226624 | 10/1986 |
| JP | 10-311763 | 11/1998 |

OTHER PUBLICATIONS

European Search Report for application No. EP 11 17 2657 mailed Oct. 25, 2011.

* cited by examiner

*Primary Examiner* — Lisa Caputo
*Assistant Examiner* — Jonathan Dunlap
(74) *Attorney, Agent, or Firm* — Merchant & Gould P.C.

(57) ABSTRACT

To provide a piston ring tension measurement apparatus which can stably measure a piston ring for suitable tension, the piston ring tension measurement apparatus of the present invention comprises: a table 1 which supports a measured piston ring 5; a first band 3 which is to be wound around an outer circumferential part of the measured piston ring 5 and which is fastened at its two end sides by fasteners 4 and 6; a second band 8 which is to be wound around an outer circumferential part of the measured piston ring 5 where the first band 3 is not wound; a fastener 11 for fastening one end side of the second band 8; a tension imparting means 14, 15, and 16 for making the second band 8 move in a direction squeezing the measured piston ring 5; and a load cell 10 which measures a tension which is imparted to the second band 8.

4 Claims, 3 Drawing Sheets

PISTON RING TENSION MEASUREMENT APPARATUS

This application is claims benefit of Serial No. 2010-154795, filed 7 Jul. 2010 in Japan and which application is incorporated herein by reference. To the extent appropriate, a claim of priority is made to the above disclosed application.

TECHNICAL FIELD

The present invention relates to a tension measurement apparatus which measures a tension of a piston ring which is to be inserted into a cylinder of an internal combustion engine etc.

BACKGROUND ART

As an apparatus for measuring the tension of a piston ring, in the past the following apparatus has been known (Japanese Patent Publication (A) No. 10-311763). A piston ring is attached to a ring holder which is then placed on a vibrating plate and vertical movement plate, a band-shaped member with one end which is fastened to a steel band holder is wound around an outer circumference of the piston ring, one end is fastened to a load cell, the load cell is made to move, the piston ring is squeezed until giving a ring gap in a state where as inserted at an inside circumference of the cylinder, then the tension is measured. At this time, the vertical movement plate gives an impact force to the piston ring to remove the large frictional force occurring between the band-shaped member and piston ring at the time of winding, while makes the vibrating plate vibrate to remove the small frictional force occurring between the band-shaped member and piston ring.

SUMMARY OF INVENTION

However, in Japanese Patent Publication (A) No. 10-311763, a single band-shaped member is wound around the outer circumference of the piston ring to squeeze the piston ring by the band-shaped member and make it vibrate, so when the vibration is stopped, the piston ring easily shifts from the position where it started vibrating and a suitable tension value cannot be stably obtained. Further, in the past, sometimes vibration was manually given to remove the frictional force, but there was a similar problem to the above.

The present invention has as its object to provide a piston ring tension measurement apparatus which can stably measure a piston ring for suitable tension.

The piston ring tension measurement apparatus of the present invention is provided with a support table which supports a measured piston ring, a first band which is to be wound around an outer circumferential part of the measured piston ring and which is fastened at its two end sides by fastening means, a second band which is to be wound around an outer circumferential part of the measured piston ring where the first band is not wound, a fastening means for fastening one end side of the second band, a tension imparting means for making the second band move in a direction squeezing the measured piston ring, and a tension measuring means for measuring a tension which is imparted to the second band.

Preferably, the first band and second band are arranged facing each other.

Preferably, the apparatus has a vibration generator which imparts vibration to the support table.

Preferably, at an intersecting part of the first band and second band, one of the bands is formed with a hole and the other of the bands is inserted through the hole.

Preferably, the apparatus has a ring holder to which the measured piston ring is attached and which is placed on the support table.

According to the present invention, two bands are used, so compared with when using one band, even when manually or automatically making the piston ring vibrate, the position of the piston ring does not change and therefore the piston ring can be stably measured for suitable tension.

BEST MODE FOR CARRYING OUT INVENTION

Figure 1:
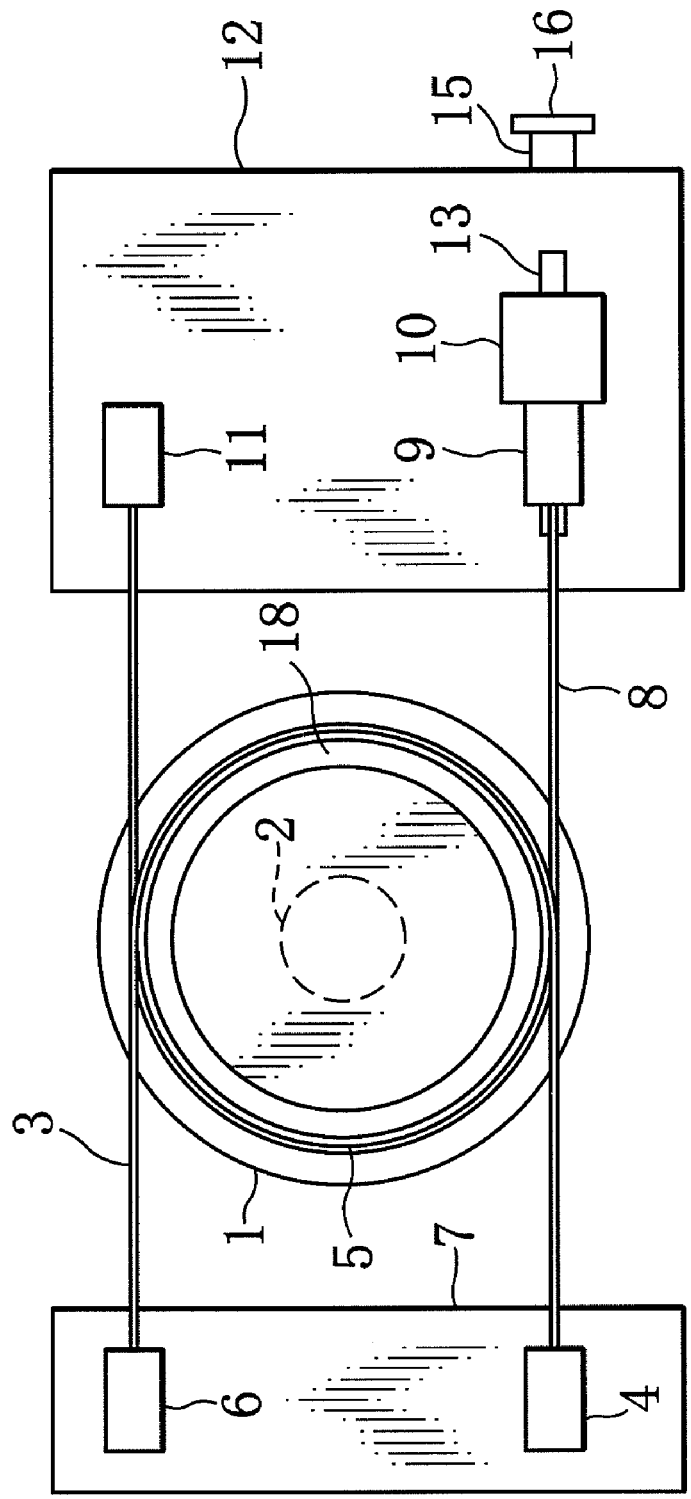
FIG. 1 is a plan view showing an embodiment of the present invention.

Below, an embodiment of the present invention will be explained while referring to the drawings.

Figure 2:
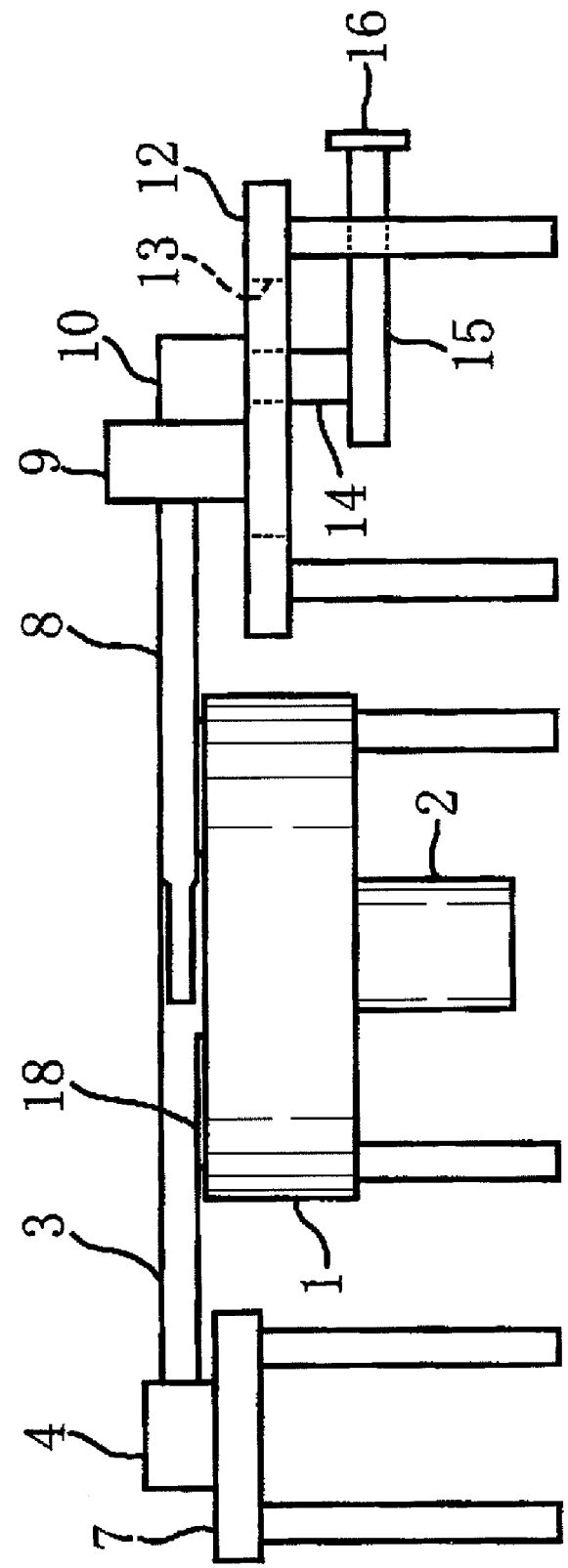
FIG. 2 is a front view of the same.

In FIG. 1 and FIG. 2, a table 1 is a flat plate having a flat top surface and a bottom surface. A vibration generator 2 which is provided at a center of the bottom surface is used to make the table 1 vibrate.

Reference numeral 3 indicates a first band which is comprised of a thin steel strip. The first band 3 is fastened at one end side to a fastener 4, is wound around the outer circumference of a measured piston ring 5 over half of the circumferential direction, and, in that state, is fastened at the other end side to a fastener 6. The two fasteners 4 and 6 are fastened arranged on a support table 7.

Reference numeral 8 indicates a second band which is comprised of a thin steel strip. The second band 8 is connected at one end side through a mover 9 to a load cell 10. That is, the mover 9 is fastened to a load cell 10, while the end of the second band 8 at the load cell 10 side is fastened to the mover 9. This second band 8 is wound around the outer circumference of the measured piston ring 5 over the half of the circumferential direction where the first band 3 is not wound and, in that state, is fastened at the other end side to a fastener 11. The fastener 11 is fastened arranged on a support table 12.

At the part of the support table 12 below the mover 9 and the load cell 10, an elongated hole 13 is provided in a direction in which the second band 8 extends. The load cell 10 is coupled through a coupling shaft 15 which is inserted through the elongated hole 13 to a telescopic rod 15. The telescopic rod 15 is designed to advance and retract in the direction in which the second band 8 extends due to rotation of an operating handle 16 and is supported by the support table 12. Therefore, by turning the operating handle 16, the load cell 10 moves in the direction in which the second band 8 extends. Due to this, the second band 8 is pulled and moved and the second band 8 causes the piston ring 5 to be squeezed.

Figure 3:
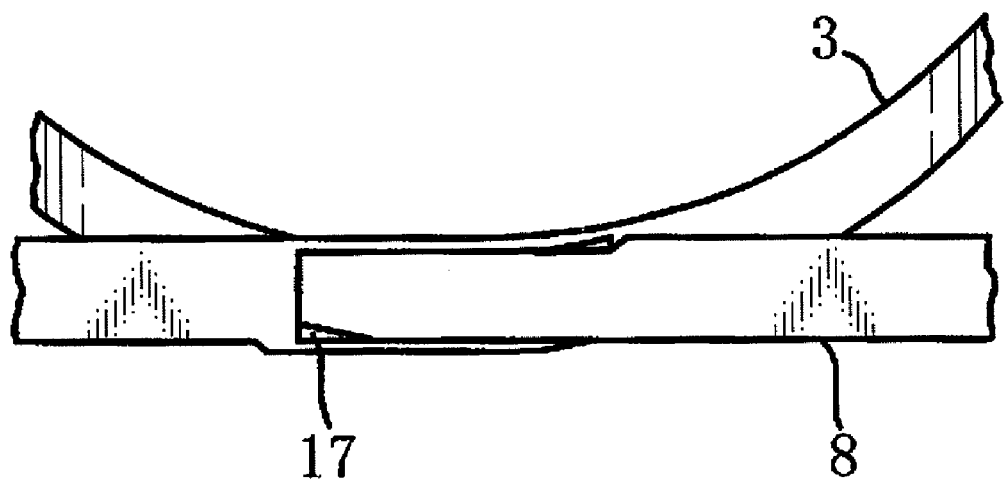
FIG. 3 is a perspective view showing an intersecting part of a first band and a second band.
Figure 4:
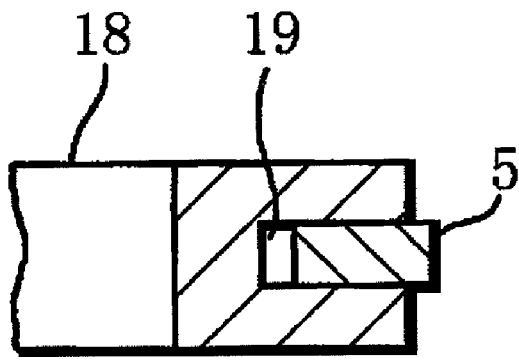
FIG. 4 is a longitudinal cross-sectional view showing one part of a ring holder to which a piston ring is attached.

At the part where the first band 3 and the second band 8 intersect, as shown in FIG. 3, the first band 3 is formed with a hole 17. In this hole 17, the second band 8 is inserted without interference.

Reference numeral 18 indicates a ring holder. The ring holder 18 is a ring-shaped member which has a ring-shaped groove 19 at its outer circumference. The measured piston ring 5 is fit in the ring-shaped groove 19.

Below, the procedure for using the above piston ring tension measurement apparatus to measure the tension of a piston ring will be explained.

A measured piston ring 5 is attached to the ring-shaped groove 19. The ring holder 18 is then placed on the table 1. The first band 3 fastened at one side by the fastener 4 is wound around the outer circumference of the piston ring 5 over half of the circumferential direction, then the other side is fastened to the fastener 6. Next, the second band fastened at one side to the mover 9 is wound around the outer circumference of the piston ring 5 over the remaining half of the circumferential direction over which the first band 3 is not wound, then the other side is fastened to the fastener 11. In this state, if using the vibration generator 2 to make the table 1 vibrate while turning the operating handle 16 to make the load cell 10 move in a direction pulling the second band 8, the second band 8 causes the piston ring 5 to be squeezed. The operating handle 16 is turned to make the load cell 10 move and squeeze the piston ring 5 until the ring gap of the piston ring 5 becomes a ring gap in a state as inserted in a cylinder. In this state, the vibration generator 2 is stopped. At this time, the load which is applied to the load cell 10 is measured as the tension of the piston ring 5.

In the above, even when the measured piston ring 5 is vibrated, since the piston ring 5 is supported by two facing bands 3 and 8, even after the piston ring 5 has been vibrated, the piston ring 5 does not change in position and therefore the piston ring 5 can be stably measured for suitable tension.

Note that, in the above embodiment, the load cell 10 was coupled with the moving end side of the second band 8, but it may also be coupled with the fixed end side to measure the tension.

REFERENCE SIGNS LIST

1 . . . table
2 . . . vibration generator
3 . . . first band
4 . . . fastener
5 . . . measured piston ring
6 . . . fastener
7 . . . support table
8 . . . second band
9 . . . mover
10 . . . load cell
11 . . . fastener
12 . . . support table
13 . . . elongated hole
14 . . . coupling shaft
15 . . . telescopic rod
16 . . . operating handle
17 . . . band insertion hole
18 . . . ring holder
19 . . . ring-shaped groove

The invention claimed is:

1. A piston ring tension measurement apparatus comprising:
    a support table which supports a measured piston ring;
    a first band which is to be wound around an outer circumferential part of said measured piston ring and which is fastened at its two end sides by fastening means;
    a second band which is to be wound around an outer circumferential part of said measured piston ring where said first band is not wound;
    a fastening means for fastening one end side of said second band;
    a tension imparting means for making said second band move in a direction squeezing said measured piston ring; and
    a tension measuring means for measuring a tension which is imparted to said second band,
    wherein one of the bands is formed with a hole and the other of the bands is inserted through said hole.

2. A piston ring tension measurement apparatus as set forth in claim 1, wherein said first band and second band are arranged facing each other.

3. A piston ring tension measurement apparatus as set forth in claim 1, wherein the apparatus has a vibration generator which imparts vibration to said support table.

4. A piston ring tension measurement apparatus as set forth in claim 1, wherein the apparatus has a ring holder to which said measured piston ring is attached and which is placed on said support table.

* * * * *